June 24, 1958 — A. E. KAUFMANN — 2,840,340
STOP VALVES
Filed Jan. 17, 1955 — 2 Sheets-Sheet 1

Inventor
ADOLF E. KAUFMANN
By Holcombe, Wetherill & Brisebois
Attorneys

June 24, 1958  A. E. KAUFMANN  2,840,340
STOP VALVES
Filed Jan. 17, 1955  2 Sheets-Sheet 2
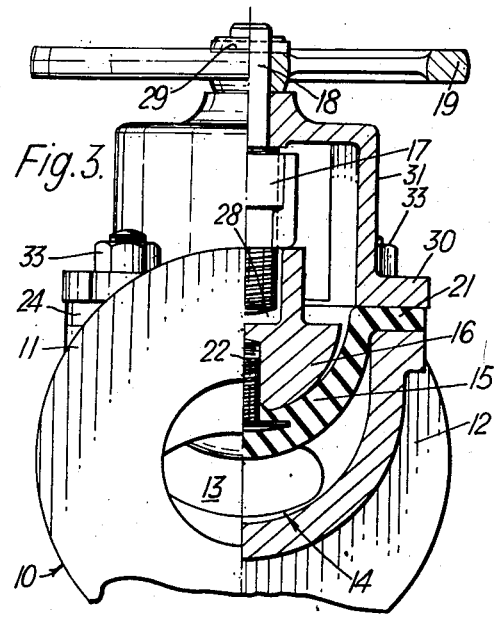
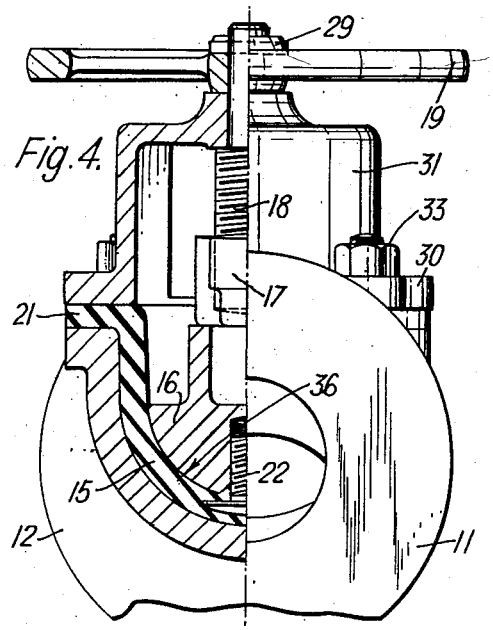
Inventor
ADOLF E. KAUFMANN
By Holcombe, Wetherill Biseboid
Attorneys

2,840,340
STOP VALVES

Adolf Ernest Kaufmann, London, England

Application January 17, 1955, Serial No. 482,339

Claims priority, application Great Britain
January 20, 1954

1 Claim. (Cl. 251—331)

Figure 1:
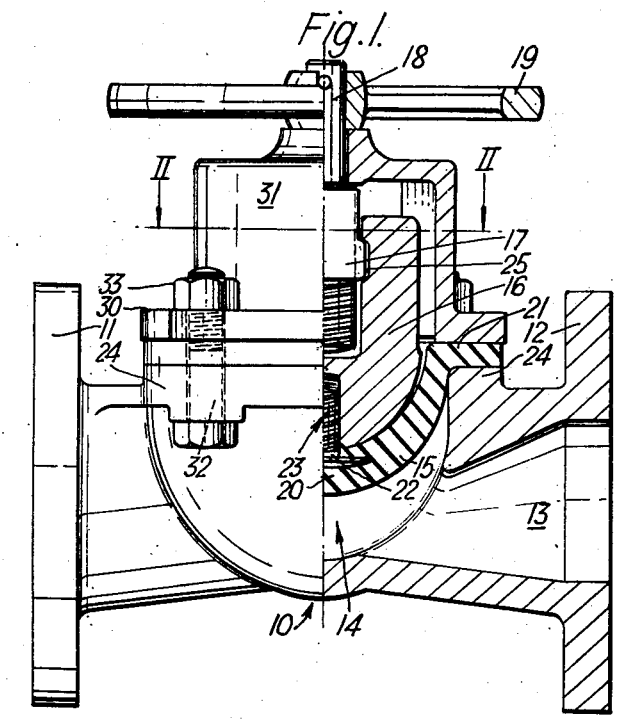
Figure 2:
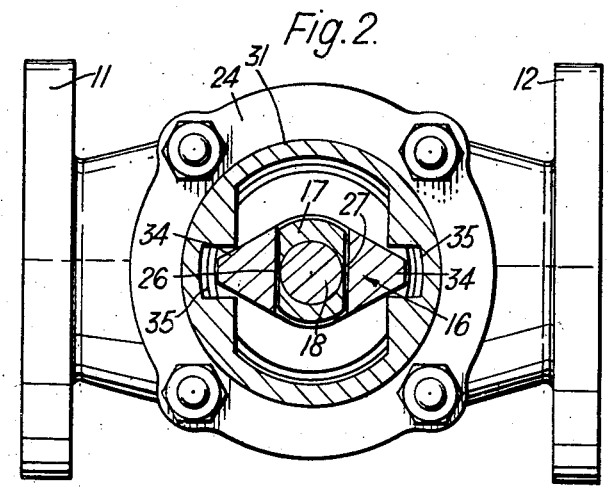

In stop valves wherein the closing means of the valve is separated from the flow space for the liquid by a rubber-like membrane which constitutes the flow-restricting member of the valve, the membrane comprising a hemispherical cupped portion and a flanged portion integral therewith and projecting externally from the rim of the cupped portion, the actuating member for closing the valve having a hemispherical working end, the membrane being secured by clamping the flanged portion to the valve body, the arrangement being that when the actuating member is closed down the cupped portion is stretched over said hemispherical end and throughout the closing operation the whole interior surface of the cupped portion is fully supported by the working end of the actuating member the hemispherical cupped portion has hitherto been of substantially uniform thickness which has presented certain difficulties in ensuring fluid-tightness when the valve is closed. The object of the present invention is to provide an improved construction of stop valve whereby this disadvantage is reduced or eliminated and this and other objects will be better understood from the following description of two practical applications of the invention which is made with reference to the accompanying drawings of which:

Figure 1 represents to the left of the vertical central line an elevation of the valve incorporating a hemispherical diaphragm and to the right of this line a longitudinal vertical section of the same valve, Figure 2 is a sectional plan of Figure 1 on the line II—II, Figure 3 to the left of the vertical central line shows an end view of the valve illustrated in Figure 1 and to the right of this line a transverse vertical section of the same valve, the valve being in the open position, Figure 4 to the left of the vertical central line shows a transverse vertical section of the valve according to Figure 1 in the closed position and to the right of this line a side elevation of the same valve in said position.

The cast iron valve body 10 (Figure 1) comprises flanges 11, 12 and a straight-through bore 13 connected by the valve bowl 14 when the valve is in the open position. The moving parts of the valve consist of the resilient membrane or diaphragm 15 of the actuating member or compression plunger 16, of guide nut 17, of spindle 18 and of hand wheel 19. The vertical cross section of the cupped portion of diaphragm 15 is formed by two eccentric semicircles which yield maximum wall thickness at the centre (at 20) and minimum wall thickness at the circumference of the membrane 15 adjacent to the integral flanged rim 21. A fixing screw 22, the head of which is moulded in membrane 15 is screwed into the threaded female part 23 of actuating member or compression plunger 16 at the time of assembly, whereupon the flange 21 is seated on the upper surface of valve bowl flange 24. Guide nut 17 fits in an appropriately shaped slot 25 of the compression plunger 16 and controls the vertical movements of this plunger but is prevented from turning about the vertical axis by means of its flats 26 and 27 (Figure 2) bearing against the flat walls of the plunger slot. The threaded part of spindle 18 is screwed into guide nut 17 with its bottom part extending into a cylindrical opening 28 (Figure 3) of compression plunger 16 in the open position, while the unthreaded top part of spindle is secured by split pin 29 to operating hand wheel 19. Flange 21 is clamped tight between valve bowl flange 24 and flange 30 of the cast iron cover 31 by means of bolts 32 and nuts 33. Compression plunger 16 is prevented from turning about the vertical axis by upper rib-like portions 34 (Figure 2) sliding at times of vertical motion within and along two vertical grooves 35 of cover 31 (Figure 2).

The closing of the valve is effected by turning spindle 18 by hand wheel 19 and thus forcing compression plunger 16 by means of guide nut 17 to descend into valve bowl 14. At the same time, compression plunger 16 compels the cupped portion of membrane 15 to stretch and to descend into valve bowl until the membrane reaches the valve seat (Figure 4) of the bowl under constant pressure and positive surface support of the lower actuating portion of plunger 16. In the final stage of closing (Figure 4), actuating surface 36 of compression plunger 16 is uniformly spaced from the valve bowl seat and compresses membrane 15 into a shape of uniform wall thickness.

The opening of the valve is effected by lifting compression plunger 16 with the aid of the above described operating mechanism thereby allowing the resilient membrane 15 to assume its original shape shown in Figures 1 and 3 having a wall thickness which increases towards the centre of the cupped portion. Membrane 15 is also assisted in its return movement to the open position by compression plunger 16 that, by means of fixing screw 22, raises the membrane.

I claim:

A stop valve comprising a valve body having a flow space therethrough for a liquid, a metal actuating member for closing the valve having a hemispherical working end which is substantially uniformly spaced from the valve body when the valve is closed, means for adjusting the actuating member to open and close the flow space, a hemispherical cupped membrane of rubber-like material engaging and fully supported by the working end of the actuating member, a flange formed integrally with said hemispherical cupped membrane and means for securing the flange to the valve body, the wall thickness of said hemispherical cupped portion in the open position decreasing substantially uniformly from the centre of the cupped portion to said flange whereby in the closed position the whole of said hemispherical cupped portion is of substantially uniform thickness.

References Cited in the file of this patent

FOREIGN PATENTS

| 403,549 | France | 1909 |
| 467,027 | France | 1914 |
| 437,463 | Great Britain | 1935 |
| 622,204 | Great Britain | 1949 |
| 655,576 | Great Britain | 1951 |
| 281,836 | Switzerland | 1952 |
| 283,176 | Switzerland | 1952 |